(12) United States Patent
Chan et al.

(10) Patent No.: US 7,279,961 B2
(45) Date of Patent: Oct. 9, 2007

(54) CHARGE PUMP FOR INTERMEDIATE VOLTAGE

(75) Inventors: Johnny Chan, Fremont, CA (US); Tin Wai Wong, Fremont, CA (US); Ken Kun Ye, Fremont, CA (US)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 11/284,780

(22) Filed: Nov. 21, 2005

(65) Prior Publication Data

US 2007/0115044 A1    May 24, 2007

(51) Int. Cl.
*G05F 1/10* (2006.01)
*G05F 3/02* (2006.01)

(52) U.S. Cl. .................. 327/540; 327/536; 363/60

(58) Field of Classification Search ............... 327/538, 327/540, 541, 543; 323/313, 316; 365/189.09
See application file for complete search history.

(56) References Cited

U.S. PATENT DOCUMENTS

| | | | | |
|---|---|---|---|---|
| 5,291,446 | A * | 3/1994 | Van Buskirk et al. | 365/189.09 |
| 5,721,485 | A * | 2/1998 | Hsu et al. | 713/323 |
| 5,783,934 | A * | 7/1998 | Tran | 323/312 |
| 6,009,022 | A * | 12/1999 | Lee et al. | 365/189.09 |
| 6,201,375 | B1 * | 3/2001 | Larson et al. | 323/277 |
| 6,249,455 | B1 * | 6/2001 | Kim | 365/185.19 |
| 6,356,488 | B1 * | 3/2002 | Kang | 365/189.09 |
| 6,535,435 | B2 * | 3/2003 | Tanaka et al. | 365/189.09 |
| 6,590,813 | B2 * | 7/2003 | Shiga | 365/189.09 |
| 6,865,116 | B2 * | 3/2005 | Kim et al. | 365/189.08 |
| 7,068,094 | B1 * | 6/2006 | Jamal et al. | 327/541 |
| 7,075,359 | B2 * | 7/2006 | Chen | 327/541 |
| 7,081,776 | B2 * | 7/2006 | Kato et al. | 327/77 |
| 7,119,604 | B2 * | 10/2006 | Chih | 327/534 |
| 2005/0280463 | A1 * | 12/2005 | Chih | 327/538 |
| 2006/0114721 | A1 * | 6/2006 | Frulio et al. | 365/185.18 |

* cited by examiner

*Primary Examiner*—Kenneth B. Wells
*Assistant Examiner*—Thomas J. Hiltunen
(74) *Attorney, Agent, or Firm*—Sierra Patent Group, Ltd.

(57) ABSTRACT

A charge pump generates a voltage higher than an intermediate voltage and a regulator circuit provides a first regulated voltage higher than the intermediate voltage. A second stage includes a regulator stage using the first voltage to provide the intermediate voltage from the first voltage. A charge pump provides a pump output voltage. The pump output voltage is divided and the divided voltage is presented to a first comparator that compares it with a reference voltage. The first comparator drives the gate of a first MOS transistor to regulate the pump output voltage to a regulated voltage related to the reference voltage. The regulated voltage is presented to a second comparator that compares it with the reference voltage. The second comparator drives the gate of a second MOS transistor to downconvert the regulated output voltage to an intermediate voltage related to the reference voltage.

6 Claims, 1 Drawing Sheet

US 7,279,961 B2

CHARGE PUMP FOR INTERMEDIATE VOLTAGE

BACKGROUND OF THE INVENTION

1. Field of the Invention

The present invention relates to integrated circuit technology and to charge pump circuits for use in integrated circuits. More particularly, the present invention relates to charge pump circuits for providing intermediate voltage potentials in integrated circuits.

2. The Prior Art

Charge pump circuits are known for providing both positive and negative voltage potentials in integrated circuits. It is, however, difficult to generate charge pump voltages that are slightly above the supply voltage because of the nature of charge pump circuits. FIG. 1 shows a typical prior-art Dickson charge pump circuit in which three diodes 10, 12, and 14 are connected in series between an input node 16 and an output node 18. A clock signal drives a first node 20 common to the cathode of diode 10 and the anode of diode 12 through a capacitor 22. The clock signal is inverted through inverter 24 and the inverted clock signal drives a second node 26 common to the cathode of diode 12 and the anode of diode 14 through a capacitor 28.

As will be appreciated by persons of ordinary skill in the art, each clock pulse will drive the output node 18 up by an amount of voltage roughly equal to $V_{DD}-V_t$, where $V_{DD}$ is the supply voltage and $V_t$ is the threshold voltage of the diodes. If $V_{DD}$ is 3V, $V_t$ is 1V, every clock cycle will drive the output node 18 up by 3V−1V=2V. If it is desired to regulate the output voltage to 4.5V, there will be a temporary overshoot to 5V, resulting in a very noisy output voltage. This can be avoided by providing fast regulation at the expense of drawing a lot of power or by providing a large capacitor on the output of the regulator. Both of these solutions are less than desirable.

BRIEF DESCRIPTION OF THE INVENTION

According to the present invention, a charge pump circuit for providing an intermediate voltage has two stages. A first stage includes a charge pump that generates a voltage higher than the intermediate voltage and a regulator circuit that provides a first regulated voltage higher than the intermediate voltage. A second stage includes a downconverter circuit that provides the intermediate voltage from the first voltage.

In one exemplary embodiment of the present invention, a charge pump provides a pump output voltage. The pump output voltage is divided and the divide voltage is presented to a first comparator that compares it with a reference voltage. The first comparator drives the gate of a first MOS transistor to regulate the pump output voltage to a regulated voltage related to the reference voltage. The regulated voltage is presented to a second comparator that compares it with the reference voltage. The second comparator drives the gate of a second MOS transistor to downconvert the regulated output voltage to an intermediate voltage related to the reference voltage.

BRIEF DESCRIPTION OF THE DRAWING FIGURES

DETAILED DESCRIPTION OF THE INVENTION

Persons of ordinary skill in the art will realize that the following description of the present invention is illustrative only and not in any way limiting. Other embodiments of the present invention will readily suggest themselves to such skilled persons.

Figure 1:
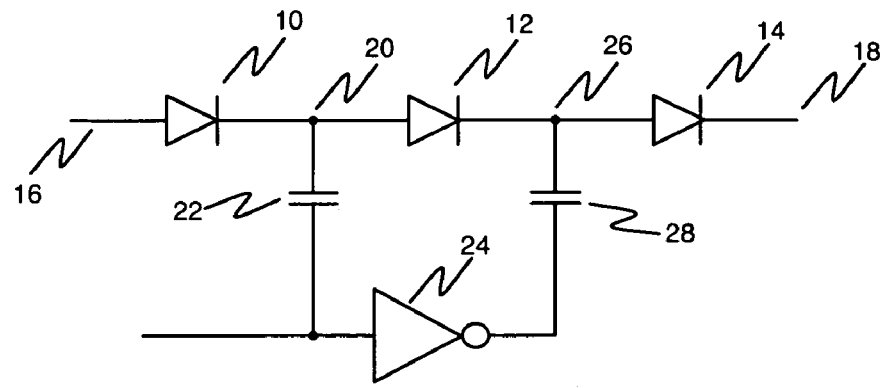
FIG. 1 is a schematic diagram of a typical prior-art charge pump.
Figure 2:
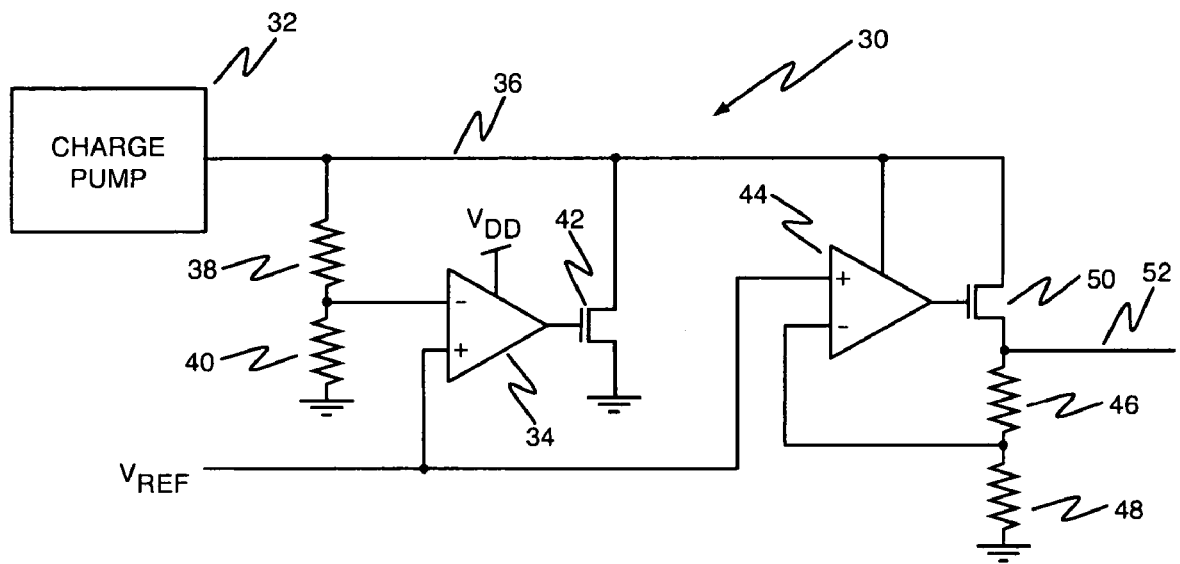
FIG. 2 is a schematic diagram of an illustrative charge pump according to an embodiment of the present invention.

Referring now to FIG. 2, a schematic diagram shows an illustrative circuit 30 for providing an intermediate voltage according to the present invention. A charge pump circuit 32 generates a first voltage higher than the intermediate voltage. As a non-limiting example, in an integrated circuit having a $V_{DD}$ supply voltage of 3V, it is desired to generate a voltage of 4.5V. In such a case, the charge pump circuit 32 may be configured to output a voltage of 7V.

A regulator circuit includes comparator 34, having the output of charge pump 32 on line 36 coupled to its inverting input through a voltage divider including resistors 38 and 40 and having a reference voltage coupled to its non-inverting input. Comparator 34 may be powered from the $V_{DD}$ supply. The output of comparator 34 is coupled to the gate of n-channel MOS transistor 42.

For example, if the reference voltage is chosen to be 1V and the ratio of the values of resistors 38 and 40 is 6:1, the comparator 34 will change state when the output voltage of the charge pump 32 on line 36 exceeds 7V, thus turning on n-channel MOS transistor 42 as will be appreciated by persons of ordinary skill in the art. Thus, the voltage on line 36 is regulated at 7V.

The regulated voltage at line 36 is used to provide the power to second comparator 44. The second comparator 44 is powered from the regulated voltage on line 36. The non-inverting input of second comparator 44 is coupled to the reference voltage. The inverting input of second comparator 44 is coupled to a voltage divider including resistors 46 and 48, connected in series between the source of n-channel MOS transistor 50 and ground. N-channel MOS transistor 50 is configured as a source follower. The gate of n-channel MOS transistor 50 is driven by the output of second comparator 44 and its drain is coupled to the regulated voltage line 36. The output of the circuit is line 52 at the source of n-channel MOS transistor 50.

The ratio of the values of resistors 46 and 48 is chosen to produce the desired output at output node 52. As an example, if an output voltage of 4.5V is desired, the ratio of resistors 46 and 48 should be chosen to be 3.5:1. By powering the comparator 44 from the regulated voltage on line 36, the downconverter circuit has power supply noise rejection.

By employing the circuit of the present invention the presence of charge pump overshoot noise on the output is prevented. The present invention allows generation of intermediate voltage levels, which are sufficiently close to the $V_{DD}$ supply voltage that would otherwise introduce unacceptable noise into the power supply potential.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A circuit for providing an intermediate voltage, including:
   a charge pump generating a first voltage higher than the intermediate voltage;
   a regulator circuit providing a first regulated voltage higher than the intermediate voltage, the regulator circuit formed from a first comparator having a reference voltage coupled to one input and a voltage divider driven from the charge pump coupled to the other input, the first comparator driving a first MOS transistor coupled between the charge pump and ground and having a gate driven by the comparator; and
   a downconverter circuit using the first regulated voltage to provide the intermediate voltage from the first voltage, the downconverter circuit formed from a second comparator having the reference voltage coupled to one input and a voltage divider coupled to the other input, the second comparator driving a second MOS transistor configured as a source follower having a gate driven by the output of the second comparator, a drain coupled to the output of the charge pump, and a source coupled to the voltage divider.

2. The circuit of claim 1 wherein the reference voltage is coupled to the non-inverting input of the first comparator and the voltage divider driven from the charge pump is coupled to the inverting input of the first comparator.

3. The circuit of claim 1 wherein the first MOS transistor is an n-channel MOS transistor.

4. The circuit of claim 1 wherein the second comparator is powered from the output of the charge pump.

5. The circuit of claim 1 wherein the reference voltage is coupled to the non-inverting input of the second comparator and the voltage divider coupled to the source of the second MOS transistor is coupled to the inverting input of the second comparator.

6. The circuit of claim 1 wherein the second MOS transistor is an n-channel MOS transistor.

* * * * *